United States Patent
Hiramatsu

(10) Patent No.: US 11,345,221 B2
(45) Date of Patent: May 31, 2022

(54) SHADE DEVICE

(71) Applicant: AISIN CORPORATION, Kariya (JP)

(72) Inventor: Shinichi Hiramatsu, Chiryu (JP)

(73) Assignee: Aisin Corporation, Aichi (JP)

( * ) Notice: Subject to any disclaimer, the term of this patent is extended or adjusted under 35 U.S.C. 154(b) by 495 days.

(21) Appl. No.: 16/381,626

(22) Filed: Apr. 11, 2019

(65) Prior Publication Data

US 2019/0315204 A1   Oct. 17, 2019

(30) Foreign Application Priority Data

Apr. 12, 2018   (JP) .............................. JP2018-077075

(51) Int. Cl.
| | | |
|---|---|---|
| *B60J 7/00* | (2006.01) | |
| *E06B 9/40* | (2006.01) | |
| *E06B 9/58* | (2006.01) | |
| *E06B 9/42* | (2006.01) | |
| *E06B 9/70* | (2006.01) | |

(52) U.S. Cl.
CPC .............. *B60J 7/0015* (2013.01); *E06B 9/40* (2013.01); *E06B 9/42* (2013.01); *E06B 9/58* (2013.01); *E06B 9/70* (2013.01)

(58) Field of Classification Search
CPC ...... B60J 1/2013; B60J 1/2019; B60J 1/2016; B60J 1/2022; B60J 1/2025; B60J 1/2044; B60J 7/0015; B60J 7/0007; B60J 7/0023; B60J 1/205; E06B 9/58; E06B 9/56; E06B 9/40; E06B 9/42; E06B 9/581
See application file for complete search history.

(56) References Cited

U.S. PATENT DOCUMENTS

| | | | |
|---|---|---|---|
| 8,246,111 | B2 | 8/2012 | Kohout et al. |
| 8,419,119 | B2 * | 4/2013 | Nakamura ............. B60J 7/0015 |
| | | | 296/214 |
| 8,997,831 | B2 | 4/2015 | Lin |
| 9,889,726 | B2 * | 2/2018 | Umeki ..................... B60J 1/205 |
| 11,014,434 | B2 * | 5/2021 | Kobayashi ............. B60J 7/0015 |
| 2010/0032991 | A1 * | 2/2010 | Keller .................... B60J 7/0015 |
| | | | 296/214 |

(Continued)

FOREIGN PATENT DOCUMENTS

| | | |
|---|---|---|
| DE | 10 2009 005 442 B4 | 3/2014 |
| JP | 2012-001885 | 1/2012 |
| TW | 201233884 A1 | 8/2012 |

*Primary Examiner* — Johnnie A. Shablack
*Assistant Examiner* — Jeremy C Ramsey
(74) *Attorney, Agent, or Firm* — Finnegan, Henderson, Farabow, Garrett & Dunner, LLP

(57) ABSTRACT

A shade device includes: guide rails extending in parallel to each other in a first direction as one direction; a winding shaft extending in a second direction as a direction orthogonal to the first direction on one end side of both of the guide rails in the first direction; a light-shielding sheet having one end portion coupled to the winding shaft; a rod extending in the second direction and coupled to the other end portion of the light-shielding sheet; sliding members attached to both of the end portions of the rod in a longitudinal direction and slidably supported by both of the guide rails; and guide members are attached to both of the end portions of the rod in the longitudinal direction, slidably supported by both of the guide rails, and fixed in a state where both of the side edges of the light-shielding sheet are folded.

9 Claims, 9 Drawing Sheets

(56) References Cited

U.S. PATENT DOCUMENTS

| | | | |
|---|---|---|---|
| 2010/0032992 A1 | 2/2010 | Keller | |
| 2012/0180961 A1* | 7/2012 | Lin | B60J 7/0015 |
| | | | 160/370.22 |
| 2019/0009656 A1* | 1/2019 | Renz | B60J 7/0015 |
| 2019/0299761 A1* | 10/2019 | Hiramatsu | B21D 53/88 |
| 2020/0198449 A1* | 6/2020 | Kim | B60J 7/0573 |

* cited by examiner

OUTER SIDE OF VEHICLE ⟵⟶ INNER SIDE OF VEHICLE

SHADE DEVICE

CROSS REFERENCE TO RELATED APPLICATIONS

This application is based on and claims priority under 35 U.S.C. § 119 to Japanese Patent Application 2018-077075, filed on Apr. 12, 2018, the entire contents of which are incorporated herein by reference.

TECHNICAL FIELD

The present disclosure relates to a shade device in which a light-shielding sheet is wound around a winding shaft to be brought into a storage state and is unwound from the winding shaft to be in an unfolded state.

BACKGROUND DISCUSSION

In general, as this type of shade device, for example, the device described in US Patent Application Publication No. 2010/0032992A1 (Reference 1) is known. This shade device is provided with a pair of guide rails extending in a front and rear direction of a vehicle, a winding shaft extending in a width direction of the vehicle at one end side in a longitudinal direction of both of the guide rails, a light-shielding sheet having one end portion coupled to the winding shaft, and a rod (operating beam) extending in the width direction of the vehicle and coupled to the other end portion of the light-shielding sheet. In addition, the shade device is provided with a pair of sliding members (mounting parts) attached to both of the end portions of the rod in the longitudinal direction and slidably supported by both of the guide rails, and a pair of guide members (positioning members) similarly attached to both of the end portions of the rod in the longitudinal direction, slidably supported by both of the guide rails, and fixed in a state where both of the side edges (both of the edges of the vehicle in the width direction) of the light-shielding sheet are folded back.

When the rod moves in the front and rear direction of the vehicle together with both of the sliding members separating from the winding shaft, the light-shielding sheet is unwound from the winding shaft to be in an unfolded state, and blocks the light passing through a light-transmitting portion provided in the vehicle. On the other hand, when the rod moves in the front and rear direction of the vehicle together with both of the sliding members approaching the winding shaft, the light-shielding sheet is wound around the winding shaft to be brought into a storage state, and allows passage of light of the light-transmitting portion.

At this time, both of the side edges of the light-shielding sheet are in a state of being folded in both of the guide rails, and are in a state where folded side edges are unfolded outside both of the guide rails. Both of the side edges of the light-shielding sheet are wound around the winding shaft in a state where the folded side edges are unfolded. Each guide member guides the light-shielding sheet so as to enter into the guide rail in a state where the side edge thereof is folded back when the light-shielding sheet is unwound from the storage state where the rod is closest to the winding shaft.

Incidentally, in Reference 1, since a position of the rod of the vehicle in the front and rear direction when the light-shielding sheet is in the storage state is correlated with the allowable amount of light passing through the light-transmitting portion, it is more preferable to make a separation distance between the rod and the winding shaft of the vehicle in the front and rear direction as short as possible. On the other hand, when the separation distance between the rod and the winding shaft of the vehicle in the front and rear direction is shortened, there is a possibility that a distance required for the change of the side edges of the light-shielding sheet between folded state and unfolded state cannot be sufficiently ensured.

Thus, a need exists for a shade device which is not susceptible to the drawback mentioned above.

SUMMARY

A shade device according to an aspect of this disclosure includes a pair of guide rails that extend in parallel to each other in a first direction as one direction, a winding shaft that extends in a second direction as a direction orthogonal to the first direction on one end side of both of the guide rails in the first direction, a light-shielding sheet that has one end portion coupled to the winding shaft, a rod that extends in the second direction and is coupled to the other end portion of the light-shielding sheet, a pair of sliding members that are attached to both of the end portions of the rod in a longitudinal direction and are slidably supported by both of the guide rails, and a pair of guide members that are attached to both of the end portions of the rod in the longitudinal direction, are slidably supported by both of the guide rails, and are fixed in a state where both of the side edges of the light-shielding sheet are folded, in which the shade device is configured such that, when the rod moves in the first direction approaching the winding shaft, the light-shielding sheet is brought into a storage state in which the light-shielding sheet is wound around the winding shaft while both of the side edges folded at the guide rails are unfolded, and a light-transmitting portion disposed in a vehicle allows light to pass therethrough, and a fixing position of the side edge at the guide member is more separated from the winding shaft than from the rod, and a range in which folding and unfolding of the side edge in the storage state of the light-shielding sheet changes overlaps with a range of the rod in the first direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a shade device will be described. Hereinafter, a front and rear direction of a vehicle is referred to as "front and rear direction", and an upper and lower sides of the vehicle in a height direction are referred to as "upper" and "lower", respectively. In addition, an inner side of the vehicle in a width direction toward an inner side of a cabin is referred to as "inner side of vehicle", and an outer side of the vehicle in the width direction toward an outer side of the cabin is referred to as "outer side of vehicle".

Figure 1:
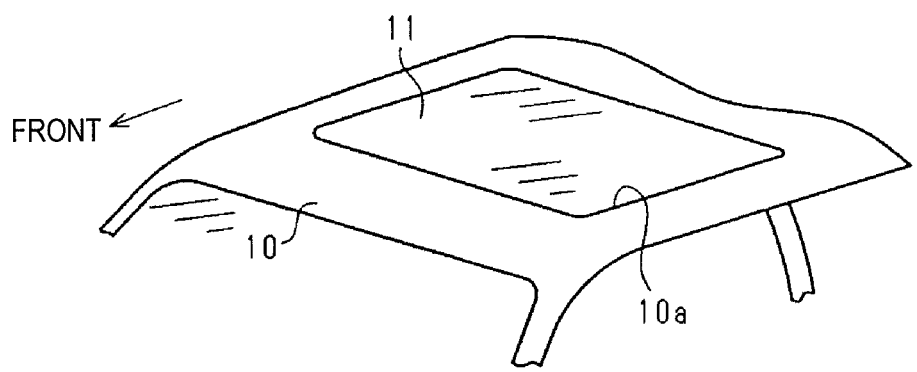
FIG. 1 is a perspective view illustrating a roof to which an embodiment of a shade device is applied.

As illustrated in FIG. 1, in a roof 10 of the vehicle such as an automobile, a substantially rectangular opening 10a is formed, and a roof panel 11 made of glass or resin as a light-transmitting portion is installed corresponding to the opening 10a.

Figure 2:
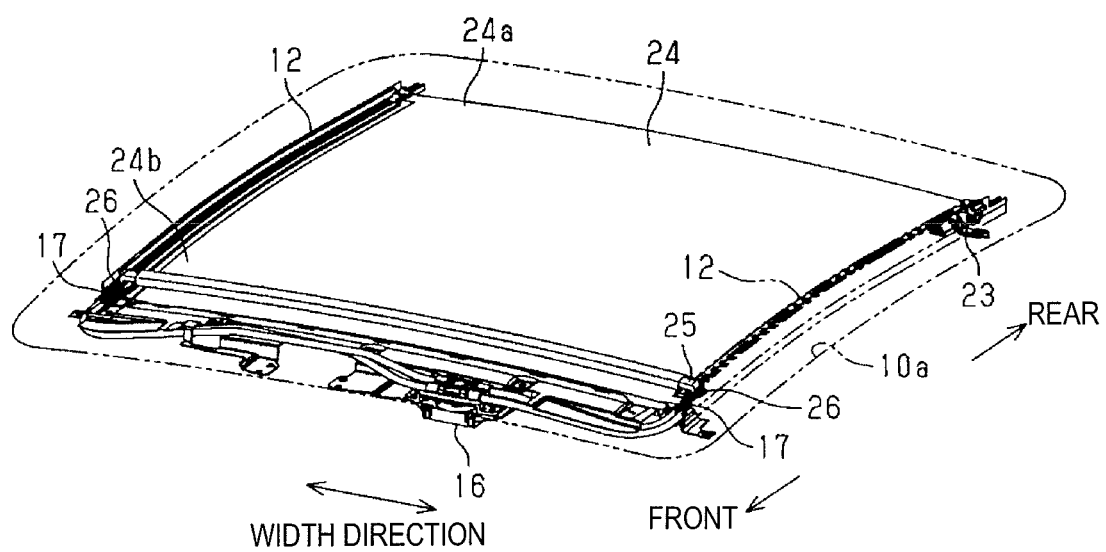
FIG. 2 is a perspective view illustrating a structure of the shade device according to the embodiment in an unfolded state.

As illustrated in FIG. 2, a pair of guide rails 12 made of an extruded material of, for example, an aluminum alloy are provided on the roof 10 so as to extend in the front and rear direction (first direction) at both of the side edge portions of the opening 10a of the vehicle in the width direction. In addition, a winding shaft 23 extending in the width direction (second direction) of the vehicle at a rear of the vehicle (one end side in the first direction) of both of the guide rails 12 is provided on the roof 10 so as to freely rotate around an axis extending in the width direction.

A first terminal portion 24a, which is one end portion of a substantially cloth-like light-shielding sheet 24, is coupled to an outer peripheral portion of the winding shaft 23 over the entire width direction of the vehicle. The winding shaft 23 is capable of winding up and unwinding the light-shielding sheet 24 with the rotation. A second terminal portion 24b, which is the other end portion of the light-shielding sheet 24, is coupled to a substantially rod-shaped garnish frame 25 as a rod over the entire width direction of the vehicle. The garnish frame 25 extends in the width direction of the winding shaft 23 at the front of the vehicle.

Both of the end portions of the garnish frame 25 in a longitudinal direction are attached to a pair of sliding members 26. Both of the sliding members 26 are supported by the guide rails 12 slidably in the front and rear direction. That is, each end portion of the garnish frame 25 in the longitudinal direction is supported by the guide rail 12 via the sliding member 26 slidably in the front and rear direction.

An actuator 16 having, for example, an electric motor and an output gear for outputting the rotation of the electric motor is installed at a predetermined position interposed between the guide rails 12 in front of the vehicle of both of the guide rails 12. The actuator 16 is coupled to a drive cable 17 formed of a pair of spiral wires. Both of the drive cables 17 are coupled to both of the sliding members 26 and simultaneously move the sliding members 26 in the front and rear direction. As a result, the garnish frame 25 moves together with both of the sliding members 26 in the front and rear direction.

With such a configuration, when the second terminal portion 24b of the light-shielding sheet 24 moves together with the garnish frame 25 to the front of the vehicle, the winding shaft 23 rotates in one direction and unwinds the light-shielding sheet 24. As a result, the light-shielding sheet 24 is in an unfolded state (fully closed state) where the light passing through the roof panel 11 toward the inside of the cabin is blocked. A biasing member (for example, such as torsion spring not illustrated) for generating a biasing force in a rotation direction for winding up the light-shielding sheet 24 in accordance with unwinding of the light-shielding sheet 24 is incorporated in the winding shaft 23.

On the other hand, when the second terminal portion 24b of the light-shielding sheet 24 moves together with the garnish frame 25 to the rear of the vehicle, the winding shaft 23 rotates in an opposite direction by the biasing force of the above biasing member and winds up the light-shielding sheet 24. As a result, the light-shielding sheet 24 is in a storage state (fully open state) allowing the passage of light toward the inside of the cabin in the roof panel 11.

Next, a support structure of the light-shielding sheet 24 and the sliding member 26 by the guide rail 12 will be described.

Figure 3:
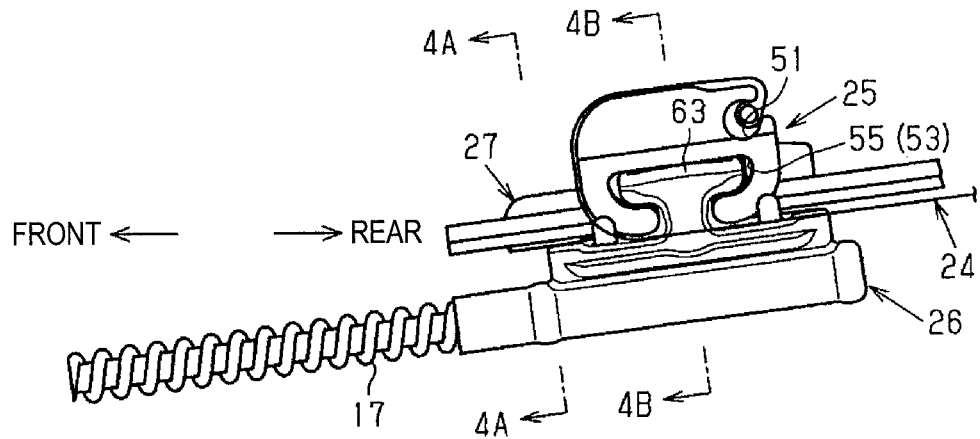
FIG. 3 is a side view illustrating the structure of the shade device of the embodiment in the unfolded state.
Figure 4A:
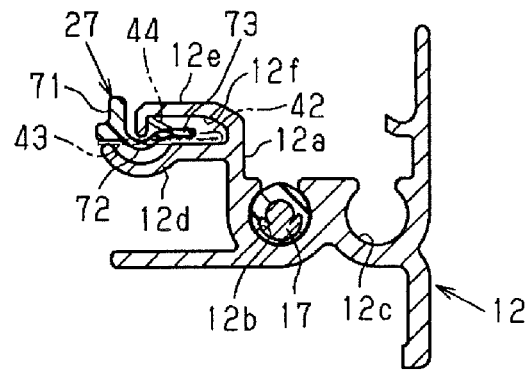
FIGS. 4A and 4B are cross-sectional views taken along lines 4A-4A and 4B-4B of FIG. 3.
Figure 4B:
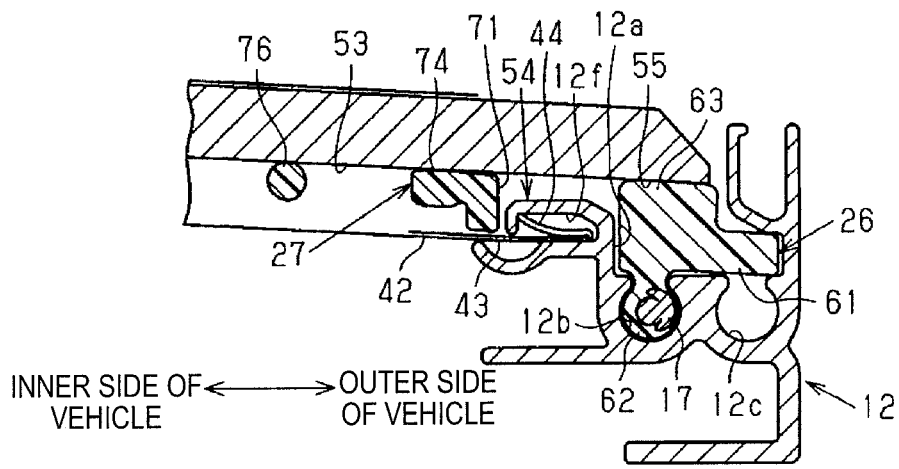

As illustrated in FIG. 3, and FIGS. 4A and 4B, in the guide rail 12, a shoe guide portion 12a having a substantially U-shaped cross section and opening upward is formed, and a pair of cable guide portions 12b and 12c recessed downward from the shoe guide portion 12a are formed so as to be aligned in the width direction of the vehicle. Each of the cable guide portions 12b and 12c has a substantially keyhole-shaped cross section, and communicates with the shoe guide portion 12a above the cable guide portions 12b and 12c. In addition, the guide rail 12 includes a first guide portion 12d extending from the inner side end of the vehicle of the shoe guide portion 12a to the inner side of the vehicle, and a second guide portion 12e extending from the inner side end of the vehicle of the shoe guide portion 12a to the inner side of the vehicle above the first guide portion 12d. A tip end portion of the first guide portion 12d is formed in a substantially arcuate cross section projected downward, and a tip end of the second guide portion 12e extends downward in accordance with the tip end portion of the first guide portion 12d. The first and second guide portions 12d and 12e cooperate with the inner side ends of the vehicle of the shoe guide portion 12a to form a side guide portion 12f.

Figure 5:
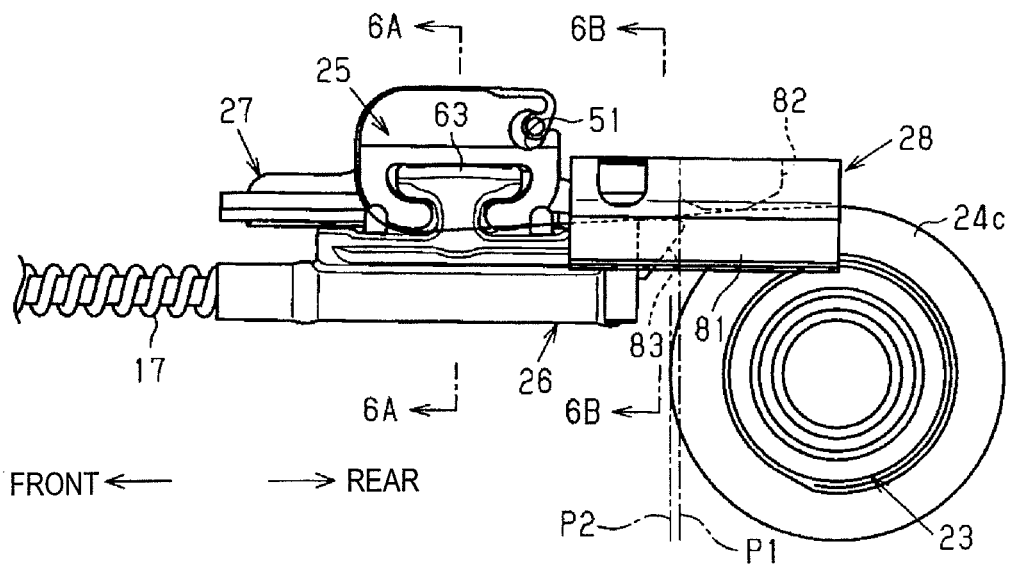
FIG. 5 is a side view illustrating the structure of the shade device of the embodiment in a storage state.
Figure 6A:
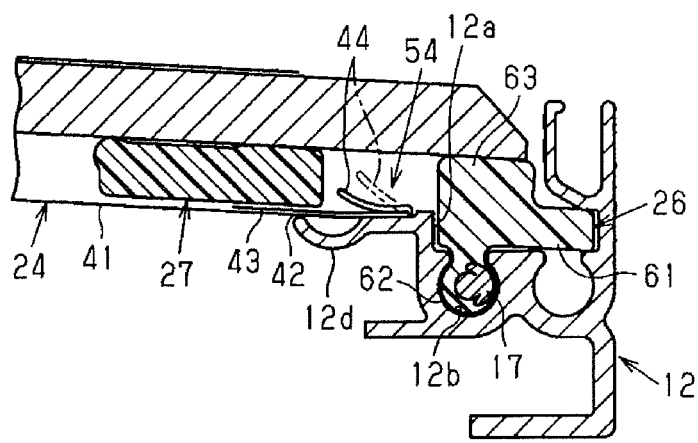
FIGS. 6A and 6B are cross-sectional views taken along lines 6A-6A and 6B-6B in FIG. 5.
Figure 6B:
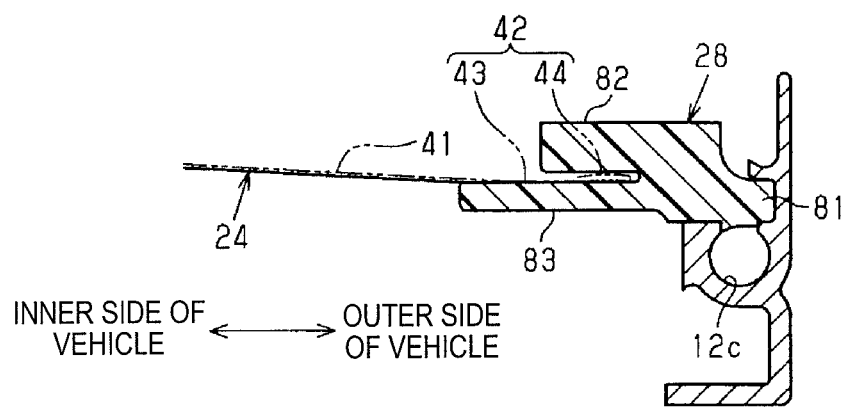

As illustrated in FIG. 5 and FIGS. 6A and 6B, the portion of the side guide portion 12f other than the first guide portion 12d is cut out at a rear end portion of the guide rail 12. The cable guide portion 12b on the inner side portion of the vehicle of the shoe guide portion 12a and on the inner side of the vehicle is cut out together with the first guide portion 12d at the rear end portion of the guide rail 12 on the further rear of the vehicle.

Figure 7:
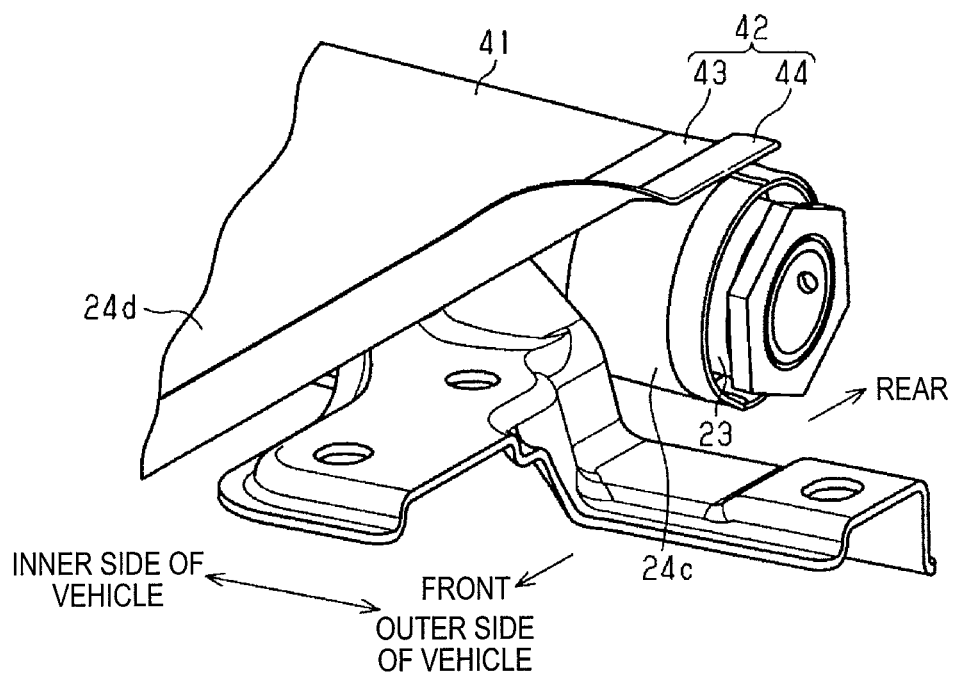
FIG. 7 is a perspective view illustrating the structure of the shade device according to the embodiment in the unfolded state.

As illustrated in FIG. 7, the light-shielding sheet 24 includes a substantially cylindrical winding portion 24c in a state of being roughly wound around the winding shaft 23, and a substantially planar unwinding portion 24*d* in a state of being unwound from the winding shaft 23. In addition, for example, the light-shielding sheet 24 includes a cover 41 made of a thin plate-like resin material having excellent design properties, and a belt member 42 as a side edge sewn or welded to each of both of the edge portions of the cover 41 in the width direction of the vehicle. The belt member 42 is in a state of being folded back from the upper side to the inner side of the vehicle at the unwinding portion 24*d*, and is in a state where the folding of the side edge is unfolded at the winding portion 24*c*.

That is, the belt member 42 is divided into a fixed portion 43 and a movable portion 44 which are positioned on the inner side of the vehicle and the outer side of the vehicle, respectively. In the unwinding portion 24*d*, the movable portion 44 forms an acute angle with respect to the fixed portion 43, and in the winding portion 24*c*, the movable portion 44 forms a substantially flat angle with respect to the fixed portion 43. The folding and unfolding of the belt member 42 change between the winding portion 24*c* and the unwinding portion 24*d*.

Figure 8:
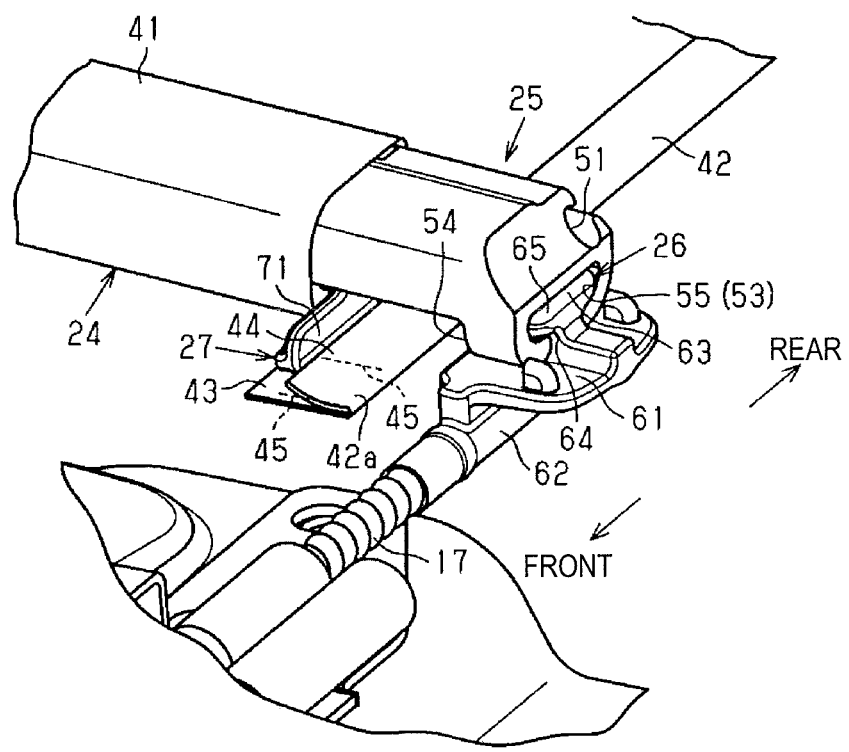
FIG. 8 is a perspective view illustrating the structure of the shade device of the embodiment in the unfolded state.
Figure 9:
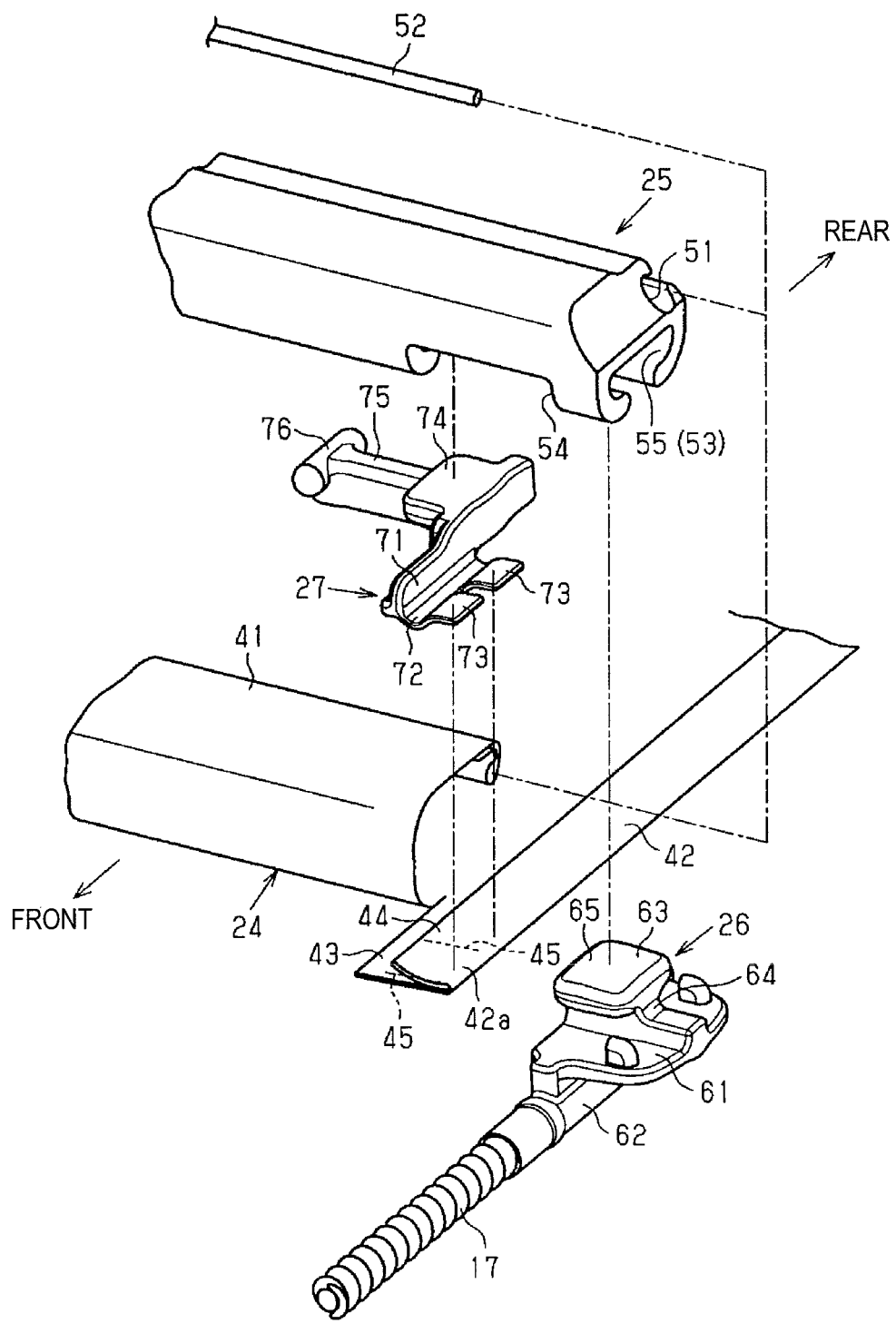
FIG. 9 is an exploded perspective view illustrating the structure of the shade device of the embodiment in the unfolded state.

As illustrated in FIGS. 8 and 9, the cover 41 and the belt member 42 are cut off at a front end portion of the light-shielding sheet 24, and the cover 41 folds back to the rear of the vehicle from above along the outer shape of the garnish frame 25 so that the belt member 42 projects forward than from the cover 41.

That is, the garnish frame 25 is made of, for example, an aluminum alloy extruded material, and has a substantially constant cross section in the longitudinal direction (width direction of the vehicle). In the garnish frame 25, a substantially keyhole-shaped cover holding groove 51 recessed frontward and downward from a rear upper corner portion of the vehicle is formed over the entire length thereof. A tip end of the cover 41 folded back to the rear of the vehicle along the outer shape of the garnish frame 25 is fitted into the cover holding groove 51 together with a cover locking rod 52 and is locked, in a state where a substantially round bar-shaped cover locking rod 52 extending in the width direction of the vehicle over substantially the entire length of the garnish frame 25 is wound clockwise in the drawing.

In the garnish frame 25, a groove portion 53 which is recessed upward and communicates in the width direction of the vehicle is formed over the entire length. The groove portion 53 has a substantially T-shaped cross section with the upper portion widened. In addition, at each end portion of the garnish frame 25 in the longitudinal direction, a recessed portion 54 which is recessed upward (third direction) and communicates in the front and rear direction (first direction) is formed. The recessed portion 54 is formed in accordance with the position of the belt member 42 in the width direction of the vehicle, and the portion of the groove portion 53 positioned on the outer side of the vehicle than from the recessed portion 54 forms a fitting recessed portion 55. It goes without saying that the fitting recessed portion 55 is recessed upward (third direction) and communicates in the width direction (second direction) of the vehicle.

The belt member 42 traverses the garnish frame 25 in the front and rear direction directly below the recessed portion 54, and the front end portion 42*a* of the belt member 42 projecting forward the vehicle than from the cover 41 is sewn in a state of being folded back (that is, in a folded state) so as to be in close contact with a pair of front and rear fine lines 45 extending in the width direction of the vehicle. A guide member 27 made of, for example, a resin material is fixed to the belt member 42 in accordance with both of the fine lines 45.

That is, the guide member 27 has a vertical wall 71 passing through the recessed portion 54 in the front and rear direction and a coupling wall 72 extending to the outer side of the vehicle from the lower end of the vertical wall 71, and further has a pair of front and rear claw portions 73 with substantially squares extending to the outer side of the vehicle form the coupling wall 72. The guide member 27 is inserted between the fixed portion 43 and the movable portion 44 in a state where the claw portions 73 are folded back so that the fine lines 45 positioned at the rear of the vehicle in the gap between both of the claw portions 73 and is fixed to the belt member 42. That is, the fixing position of the belt member 42 of the guide member 27 is set so that at least the claw portion 73 in front of the vehicle is positioned ahead than from the garnish frame 25. It goes without saying that the belt member 42 is fixed to the guide member 27 in a state of being folded back (in a folded state).

As illustrated in FIGS. 4A and 4B, the belt member 42 is slidably supported by the side guide portion 12*f* of the guide rail 12 in a state where the movable portion 44 is folded back from above to the fixed portion 43. On the other hand, in a state of being fixed to the belt member 42, the vertical wall 71 of the guide member 27 is positioned on the inner side of the vehicle adjacent to the second guide portion 12*e*. The coupling wall 72 has a substantially arcuate cross section which is projected downward in accordance with the tip end portion of the first guide portion 12*d*. In addition, both of the claw portions 73 are inserted between the fixed portion 43 and the movable portion 44 of the belt member 42 on the flat base end portion of the first guide portion 12*d*. Accordingly, the belt member 42 is allowed to open from a state of being folded back at the rear of the vehicle than from the rear end of the second guide portion 12*e* and the rear of the vehicle than from the fine line 45.

As illustrated in FIGS. 8 and 9, the guide member 27 has a substantially quadrangular plate-like fitting wall 74 projecting from the rear end portion of the vertical wall 71 toward the inner side of the vehicle, has a substantially quadrangular column-like arm portion 75 which is contracted in width in the front and rear direction from the fitting wall 74 and further projects than from the fitting wall 74 toward the inner side of the vehicle, and further has a fitting pin 76 coupled to the tip end of the arm portion 75. The fitting wall 74 is formed so as to be fitted into the groove 53 from the outer side of the vehicle. The fitting pin 76 has a substantially cylindrical shape in which a center line extends in the front and rear direction, and is formed so that the fitting pin 76 can be fitted into the groove portion 53 in a state where the rotation around the center line is allowed. The arm portion 75 is formed so that the arm portion 75 can pass through the opening below the groove portion 53 when the fitting pin 76 performs the above rotation. The guide member 27 is attached and fixed to the garnish frame 25 by fitting the fitting wall 74 and the fitting pin 76 into the groove 53.

The sliding member 26 has a substantially quadrangular plate-like sliding wall 61 and has a substantially keyhole-shaped column-like sliding projection portion 62 that projects downward from the inner side end of the vehicle of the sliding wall 61. The sliding projection portion 62 has a center line extending in the front and rear direction, and the dimension in the direction is set so as to project in the front and rear direction than from the sliding wall 61. One drive cable 17 is fixed to the sliding projection portion 62.

As illustrated in FIGS. 4A and 4B, the sliding member 26 is slidably supported by the guide rail 12 in a state where the sliding wall 61 and the sliding projection portion 62 are attached to the shoe guide portion 12a and the cable guide portion 12b of the guide rail 12, respectively. In the cable guide portion 12b, a portion extending in the front and rear direction of one drive cable 17 fixed to the sliding member 26 is slidably supported. In the cable guide portion 12c, a non-fixed portion (free end) is slidably supported by the sliding member 26 extending in the front and rear direction of the other drive cable 17.

As illustrated in FIGS. 8 and 9, the sliding member 26 has a fitting projection portion 63 projecting upward from the upper surface of the sliding wall 61. The fitting projection portion 63 has a throttle portion 64 coupled to the upper surface of the sliding wall 61 and passing through the opening below the fitting recessed portion 55, a widened portion 65 coupled to the upper end of the throttle portion 64 and widened in the front and rear direction, has a substantially T-shaped column shape, and can be fitted into the fitting recessed portion 55 from the outer side of the vehicle. The sliding member 26 is attached and fixed to the garnish frame 25 by fitting the fitting projection portion 63 into the fitting recessed portion 55. As a result, when both of the sliding members 26 move in the front and rear direction along the guide rail 12, the garnish frame 25 moves together with both of the guide members 27 in the front and rear direction.

Next, the mounting structure of the garnish frame 25 and the sliding member 26 will be described.

Figure 10A:
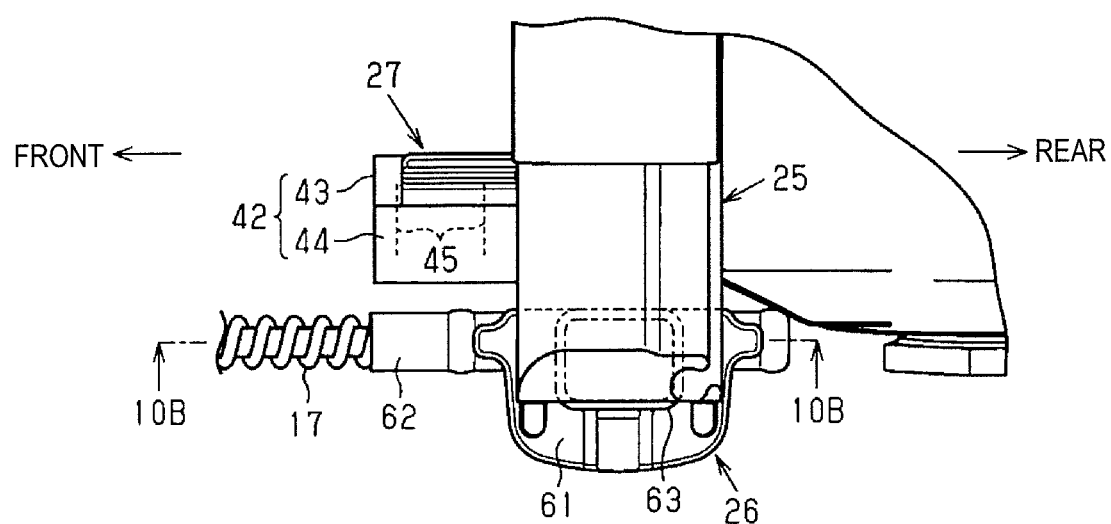
FIG. 10A is a plan view illustrating the structure of the shade device of the embodiment in the storage state.
Figure 10B:
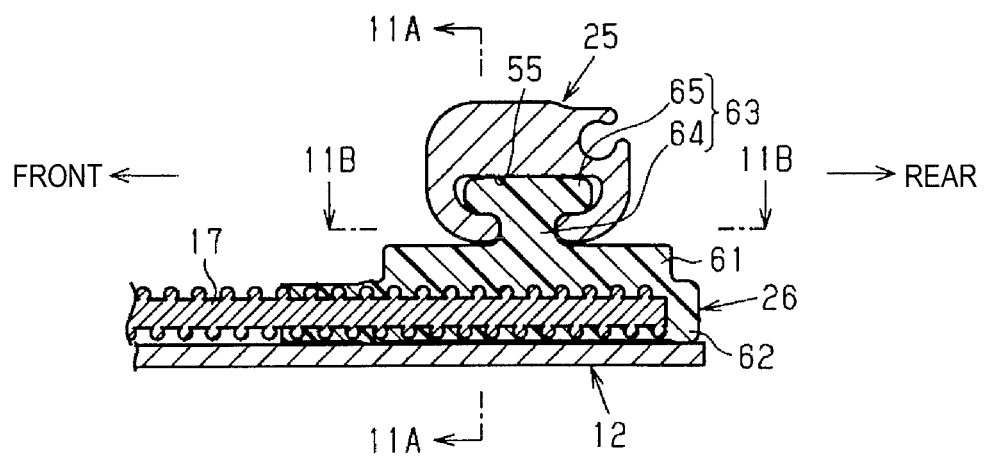
FIG. 10B is a cross-sectional view taken along line 10B-10B of FIG. 10A.

As illustrated in FIGS. 10A and 10B, the fitting projection portion 63 of the sliding member 26 is fitted into the fitting recessed portion 55 in a state where the outside is enclosed. As described above, since the aluminum alloy garnish frame 25 is set to have a higher rigidity than the sliding member 26, the own deformation is suppressed. Although the fitting projection portion 63 of the sliding member 26 is made of resin, the outside is enclosed by the fitting recessed portion 55 of the garnish frame 25 having the high rigidity, so that the deformation thereof is suppressed so as to be accommodated in the fitting recessed portion 55. Therefore, it is possible to more efficiently transmit power in the front and rear direction between the garnish frame 25 and the sliding member 26.

Figure 11A:
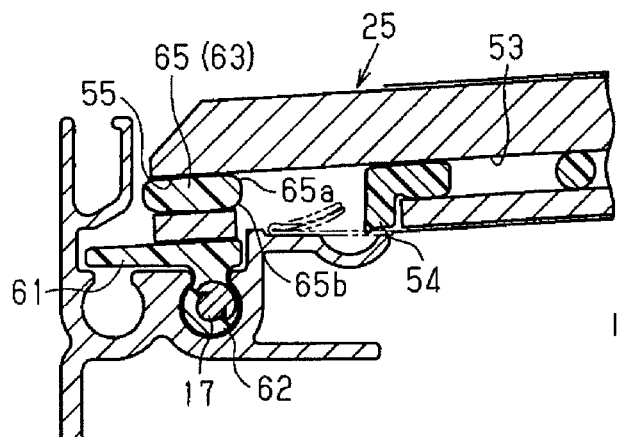
FIGS. 11A and 11B are cross-sectional views taken along line 11A-11A and 11B-11B of FIG. 10.
Figure 11B:
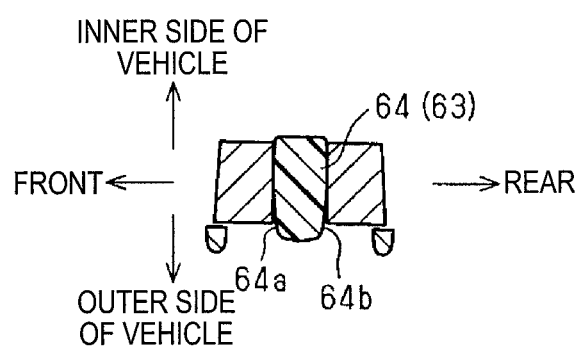

In addition, as illustrated in FIGS. 11A and 11B, a coupling portion (fitting recessed portion 55 and fitting projection portion 63) of the garnish frame 25 and the sliding member 26 is positioned directly above a sliding portion (sliding wall 61) of the sliding member 26. That is, the coupling portion of the garnish frame 25 and the sliding member 26 and the sliding portion of the sliding member 26 are misaligned only in the height direction of the vehicle, and the positions in the width direction and the front and rear direction overlap with each other.

Furthermore, curved surfaces 65a and 65b are formed on the widened portion 65 of the sliding member 26 in a state of chamfering the upper and lower corner portions on the inner side of the vehicle, respectively. That is, each of the curved surfaces 65a and 65b is opposed to the flat surface of the corresponding inner wall surface of the fitting recessed portion 55. Both of the curved surfaces 65a and 65b are for alleviating the phase difference generated in the height direction of the vehicle between the pair of left and right sliding members 26.

In addition, curved surfaces 64a and 64b are formed on the throttle portion 64 of the sliding member 26 in a state of chamfering the corner portions on the front and the rear of the outer side of the vehicle, respectively. That is, each of the curved surface 64a and 64b is opposed to the flat surface the corresponding inner wall surface of the fitting recessed portion 55. Both of the curved surfaces 64a and 64b are for alleviating the phase difference generated in the front and rear direction between the pair of left and right sliding members 26.

Next, the structure will be described related to the change of the folding and unfolding of the belt member 42 in the rear of the vehicle than from the rear end of the second guide portion 12e.

Figure 12:
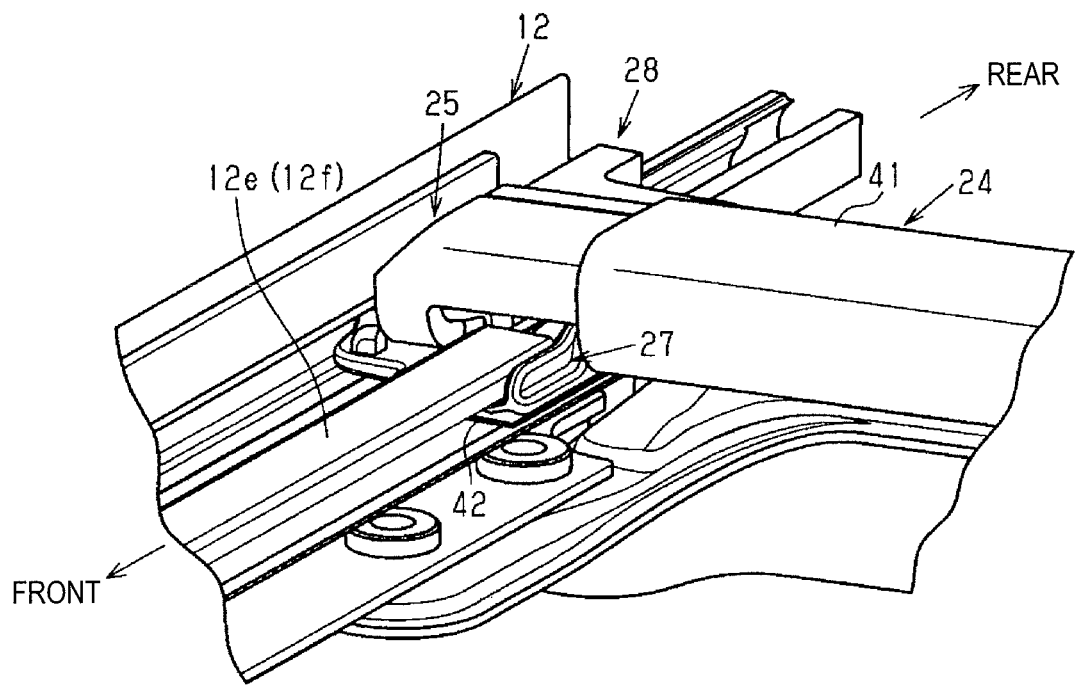
FIG. 12 is a perspective view illustrating the structure of the shade device according to the embodiment in the storage state.
Figure 13:
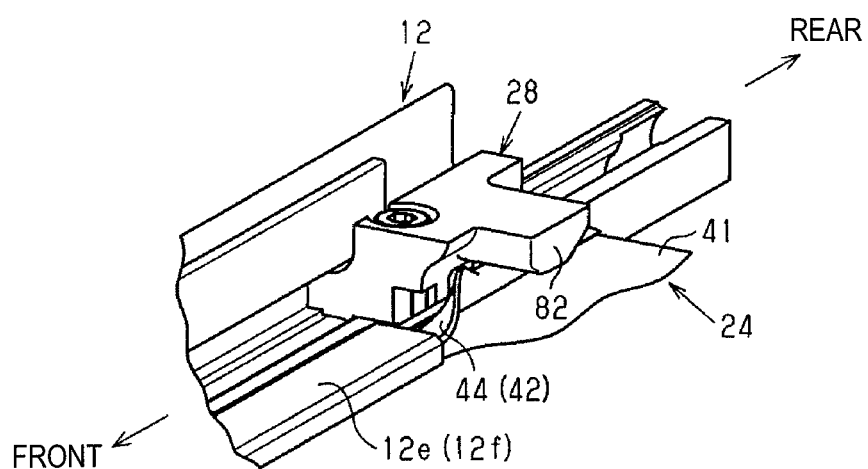
FIG. 13 is a perspective view illustrating the structure of the shade device according to the embodiment in the unfolded state.

As illustrated in FIG. 12, when the light-shielding sheet 24 is in the storage state, substantially the whole of the garnish frame 25 is positioned in the rear of the vehicle than from the rear end of the second guide portion 12e. As illustrated in FIG. 13, an unfolding hold member 28 made of a resin material, for example, is fastened to the guide rail 12 in the rear of the vehicle than from the garnish frame 25.

Figure 14:
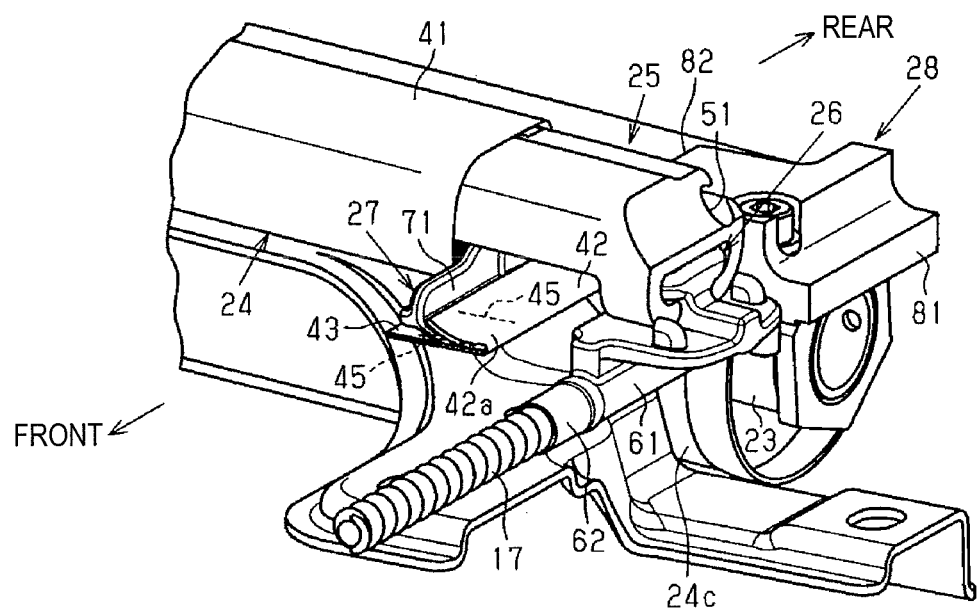
FIG. 14 is a perspective view illustrating the structure of the shade device according to the embodiment in the unfolded state.
Figure 15:
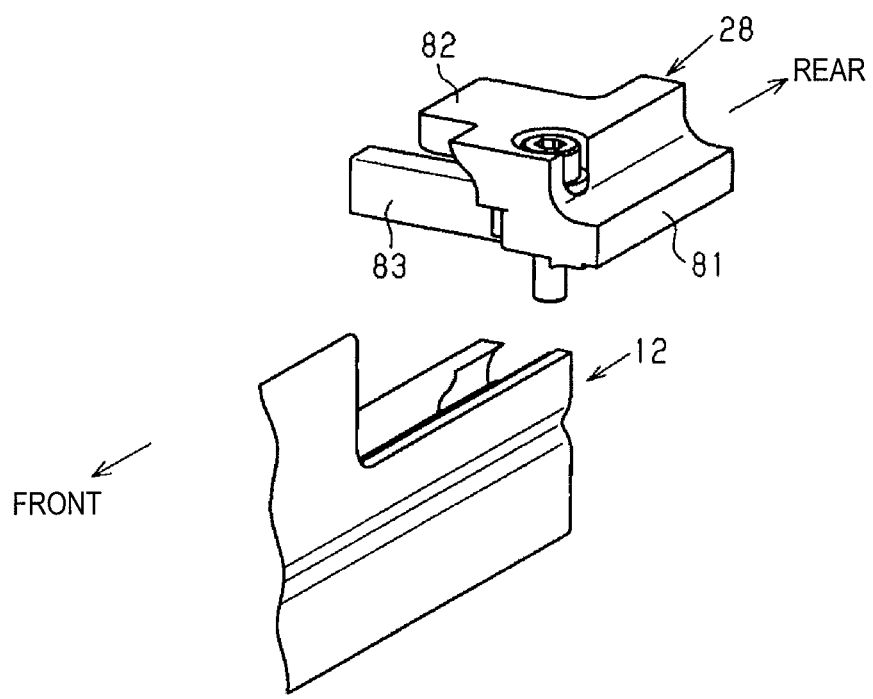
FIG. 15 is an exploded perspective view illustrating the structure of the shade device according to the embodiment.

As illustrated in FIGS. 6, 14, and 15, the unfolding hold member 28 has a main body portion 81 having a substantially L-shaped cross section and placed on the guide rail 12 above the cable guide portion 12c. In addition, the unfolding hold member 28 has an upper side holding portion 82 projecting toward the inner side of the vehicle so as to extend along the upper surface of the main body portion 81 in the middle portion in the front and rear direction, and has a lower side holding portion 83 projecting from the main body portion 81 toward the inner side of the vehicle below the upper side holding portion 82 and in front of the vehicle.

Since the lower side holding portion 83 is positioned in the rear of the vehicle than from the rear end on the inner side portion of the vehicle of the shoe guide portion 12a, interference with the guide rail 12 is avoided, and the tip end thereof is positioned in the vicinity of the inner side end of the vehicle of the belt member 42. On the other hand, although the upper side holding portion 82 has a projecting length shorter than that of the lower side holding portion 83, the tip end of the upper side holding portion 82 is positioned on the inner side of the vehicle from a boundary position between the fixed portion 43 and the movable portion 44 of the belt member 42. The belt member 42 is inserted between the upper side holding portion 82 and the lower side holding portion 83 in a state where the folding is opened. As a result, the belt member 42 is held in the state where the folding is opened by the unfolding hold member 28. In other words, the unfolding hold member 28 holds the belt member 42 in the state where the folding is opened in the rear of the vehicle than from the front end of the upper side holding portion 82, and opens the upper portion in the front of the vehicle than from the front end of the upper side holding portion 82, so as to allow the belt member 42 to be folded back.

As described above, the belt member 42 is allowed to open from the state of being folded back in the rear of the vehicle than from the rear end of the second guide portion 12e. Accordingly, the change of the belt member 42 from the folded state to the unfolded state is completed within the range in the front and rear direction from the rear end of the second guide portion 12e to the upper side holding portion 82. That is, when the light-shielding sheet 24 is in the storage state, the range in the front-back direction of the change (that is, section in which the belt member 42 is opened while being twisted until the belt member 42 is wound around the winding shaft 23) overlaps with the range in the front and rear direction of the garnish frame 25.

As illustrated in FIG. 5, the front end of the upper side holding portion 82, that is, a boundary position P1 at which the folding of the belt member 42 is allowed and the belt member 42 is held in the unfolded state by the unfolding hold member 28, is positioned in the rear of the vehicle than from a foremost outer peripheral position P2 of the winding portion 24c when the light-shielding sheet 24 is in the storage state, that is, the foremost outer peripheral position P2 of the winding portion 24c at which the diameter is the maximum. That is, in the front and rear direction, the boundary position P1 is more separated from the guide rail 12 than from the outer peripheral position P2 which is the closest to the guide rail 12 of the light-shielding sheet 24 in the storage state.

With such a configuration, when the second terminal portion 24b of the light-shielding sheet 24 moves together with the garnish frame 25 to the front of the vehicle along the guide rail 12, the upper portion of the belt member 42 of the light-shielding sheet 24 unwound from the winding shaft 23 is opened in the range in the front and rear direction from the upper side holding portion 82 to the side guide portion 12f (second guide portion 12e) of the guide rail 12, so that the belt member 42 enters the side guide portion 12f of the guide rail 12 while changing from the state where the folding is opened to the folded state.

On the other hand, when the second terminal portion 24b of the light-shielding sheet 24 moves together with the garnish frame 25 to the rear of the vehicle along the guide rail 12, the upper portion of the belt member 42 of the light-shielding sheet 24 unwound from the winding shaft 23 is opened in the range in the front and rear direction from the side guide portion 12f (second guide portion 12e) of the guide rail 12 to the upper side holding portion 82, so that the belt member 42 enters between the upper side holding portion 82 and the upper side holding portion 82 while changing from the state where the folding is opened to the folded state. When the light-shielding sheet 24 approaches the storage state, the range in the front and rear direction of the change starts to overlap the range in the front and rear direction of the garnish frame 25.

The operation and effects of the embodiment disclosed here will be described.

(1) In the embodiment disclosed here, the fixing position of the belt member 42 of the guide member 27 in the front and rear direction is more separated from the winding shaft 23 than from the garnish frame 25, and the range in which the folding and unfolding of the belt member 42 in the storage state of the light-shielding sheet 24 changes overlaps with the range of the garnish frame 25. That is, the light-shielding sheet 24 in the storage state ensures the distance required for the change of the folding and unfolding of the belt member 42 using the range of the garnish frame 25 in the front and rear direction. Accordingly, in the storage state of the light-shielding sheet 24, the garnish frame 25 can be brought closer to the winding shaft 23 in the front and rear direction, and the allowable amount of light passing through the roof panel 11 can be further enlarged.

(2) In the embodiment disclosed here, since the belt member 42 passes through the recessed portion 54 and is fixed to the guide member 27, the space required for the height of the vehicle can be further reduced as compared with the case where the belt member 42 is fixed to the guide member 27 while shifting the belt member 42 in the height direction of the vehicle with respect to the garnish frame in which the recessed portion 54 is not formed, for example.

(3) In the embodiment disclosed here, the unfolding hold member 28 is provided which is arranged between the guide rail 12 (first guide portion 12d) and the winding shaft 23, allows the belt member 42 to fold back on the guide rail 12 side, and holds the belt member 42 in the unfolded state on the winding shaft 23 side. Accordingly, by the unfolding hold member 28, it is possible to hold the belt member 42 in the unfolded state prior to winding up the light-shielding sheet 24 on the winding shaft 23, and to more smoothly wind up the light-shielding sheet 24 on the winding shaft 23.

(4) In the embodiment disclosed here, the boundary position P1 at which the folding of the belt member 42 is allowed and the belt member 42 is held in the unfolded state by the unfolding hold member 28 is more separated from the guide rail 12 than the outer peripheral position P2 which is the closest to the guide rail 12 of the light-shielding sheet 24 (winding portion 24c) in the storage state, in the front and rear direction. Accordingly, by the unfolding hold member 28, the light-shielding sheet 24 in the storage state is allowed to fold back the belt member 42 from a position more separated from the guide rail 12 than from the outer peripheral position P2, which is the closest to the guide rail 12 in the front and rear direction. Therefore, it is possible to ensure the distance required for the change of the folding and unfolding of the belt member 42, for example, as compared with the case of being allowed from the outer peripheral position P2. The garnish frame 25 can be further brought closer to the winding shaft 23 in the front and rear direction in the storage state of the light-shielding sheet 24, and the allowable amount of the light passing through the roof panel 11 can be further enlarged.

(5) In the embodiment disclosed here, the fitting recessed portion 55 recessed in the height direction of the vehicle and communicating in the width direction is formed on each end portion in the longitudinal direction of the garnish frame 25, and the fitting projection portion 63 projecting in the height direction of the vehicle and fitted into the fitting recessed portion 55 is formed on the sliding member 26. That is, the fitting projection portion 63 is surrounded by the fitting recessed portion 55 by fitting into the fitting recessed portion 55. Accordingly, since the garnish frame 25 made of aluminum alloy is set to have higher rigidity than the sliding member 26 made of resin, deformation of the fitting projection portion 63 is suppressed by the fitting recessed portion 55. Therefore, it is possible to more efficiently transmit power in the front and rear direction between the garnish frame 25 and the sliding member 26.

(6) In the embodiment disclosed here, as illustrated in FIG. 11A, the coupling portion (fitting recessed portion 55 and fitting projection portion 63) of the garnish frame 25 and the sliding member 26 is positioned directly above the sliding portion (sliding wall 61) of the sliding member 26. That is, the coupling portion between the garnish frame 25 and the sliding member 26 and the sliding portion of the sliding member 26 are overlapped with each other in the height direction of the vehicle, so that the phase difference in the width direction and the front and rear direction is eliminated. Accordingly, it is possible to suppress the occurrence of twisting at the coupling portion between the garnish frame 25 and the sliding member 26.

That is, the garnish frame 25 is constantly pulled toward the rear of the vehicle by the rotational force for winding the light-shielding sheet 24, and the position of the sliding member 26 in the front and rear direction is held by the drive cable 17. Therefore, for example, when there is a phase difference in the width direction of the vehicle between the coupling portion of the garnish frame 25 and the sliding member 26 and the sliding portion of the sliding member 26, there is a possibility that twisting may occur at the coupling portion of the garnish frame 25 and the sliding member 26. On the other hand, in the embodiment disclosed here, since the coupling portion of the garnish frame 25 and the sliding member 26 and the sliding portion of the sliding member 26 are not shifted in the width direction of the vehicle, it is possible to suppress occurrence of twisting at the coupling portion of the garnish frame 25 and the sliding member 26. It is possible to suppress the increase in the operation load of the light-shielding sheet 24 and the occurrence of abnormal noise.

(7) In the embodiment disclosed here, as illustrated in FIG. 11A, the pair of curved surfaces 65a and 65b are respectively formed in the widened portion 65 of the sliding member 26 in a state of chamfering the upper and lower corner portions on the inner side of the vehicle. By both of the curved surfaces 65a and 65b, the phase difference generated in the height direction of the vehicle between the pair of left and right sliding members 26 can be alleviated. It is possible to suppress occurrence of twisting in the height direction of the vehicle between the fitting projection portion 63 and the fitting recessed portion 55 in the widened portion 65.

(8) In the embodiment disclosed here, as illustrated in FIG. 11B, the pair of curved surfaces 64a and 64b is respectively formed in the throttle portion 64 of the sliding member 26 in a state of chamfering the front and rear corner portions of the outer side of the vehicle. By both of the curved surfaces 64a and 64b, the phase difference generated in the front and rear direction between the pair of left and right sliding members 26 can be alleviated. It is possible to suppress occurrence of twisting in the front and rear direction between the fitting projection portion 63 and the fitting recessed portion 55 in the throttle portion 64.

The embodiment disclosed here can be modified and implemented as below. The embodiment disclosed here and the following modifications can be implemented in combination with each other to the extent not technically contradicting.

Figure 16:
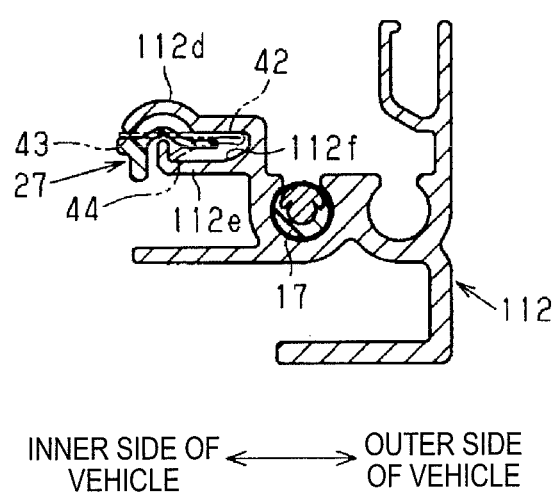
FIG. 16 is a transverse cross-sectional view illustrating a structure of a modification of a shade device.

In the above embodiment disclosed here, the guide rail 12 having the side guide portion 12f on which the second guide portion 12e is disposed above the first guide portion 12d is adopted. On the other hand, as illustrated in FIG. 16, a guide rail 112 having a side guide portion 112f on which a second guide portion 112e is disposed below a first guide portion 112d may be adopted. In this case, the belt member 42 of the light-shielding sheet 24 is slidably supported by the side guide portion 112f in a state where the movable portion 44 is folded back from the lower side with respect to the fixed portion 43.

In the above embodiment disclosed here, the second terminal portion 24b of the light-shielding sheet 24 may be coupled to the garnish frame 25 by, for example, sewing or welding.

In the above embodiment disclosed here, the sliding member 26 and the guide member 27 may be integrally formed.

In the above embodiment disclosed here, the belt member 42 of the light-shielding sheet 24 may be fixed to the guide member 27 by, for example, sewing or welding.

In the above embodiment disclosed here, the coupling portion (fitting recessed portion 55 and fitting projection portion 63) of the garnish frame 25 and the sliding member 26 and the sliding portion (sliding wall 61) of the sliding member 26 may be shifted in at least one of the width direction and the front and rear direction of the vehicle.

In the above embodiment disclosed here, although a fitting structure in which the fitting projection portion 63 is fitted into the fitting recessed portion 55 from the outer side of the vehicle is adopted, a fitting structure in which the fitting projection portion 63 is fitted from, for example, the inner side of the vehicle or from below may be adopted.

In the above embodiment disclosed here, the sliding member 26 and the garnish frame 25 are coupled in a state where the fitting projection portion 63 is surrounded by the fitting recessed portion 55. On the other hand, a fitting projection portion in conformity with the fitting projection portion 63 may be formed on the garnish frame 25, and a fitting recessed portion into which the fitting projection portion is fitted in conformity with the fitting recessed portion 55 may be formed in the sliding member 26.

In the above embodiment disclosed here, the boundary position P1 at which the folding back of the belt member 42 is allowed and the belt member 42 is held in the unfolded state by the unfolding hold member 28 is more separated from the guide rail 12 than the outer peripheral position P2 which is the closest to the guide rail 12 of the light-shielding sheet 24 (winding portion 24c) in the storage state, in the front and rear direction. On the other hand, the boundary position P1 may be coincident with the outer peripheral position P2, or may be closer to the guide rail 12 than from the outer peripheral position P2.

In the above embodiment described above, when the belt member 42 can be opened by, for example, an elastic restoring force or the like prior to winding up the light-shielding sheet 24 on the winding shaft 23, the unfolding hold member 28 may be omitted.

In the above embodiment disclosed here, the garnish frame 25 may not extend to the outer side of the vehicle until the garnish frame 25 crosses the second guide portion 12e (side guide portion 12f). That is, in the width direction of the vehicle, the tip end of the garnish frame 25 may be positioned in the vicinity of the tip end of the first guide portion 12d. In this case, it is more preferable that the sliding member 26 extends the widened portion 65 (fitting projection portion 63) toward the inner side of the vehicle to the tip end of the garnish frame 25 and fits the widened portion 65 into the garnish frame 25.

In the above embodiment disclosed here, the recessed portion 54 of the garnish frame 25 may be omitted. In this case, the belt member 42 may be fixed to the guide member 27 while shifting the belt member 42 in the height direction of the vehicle with respect to the garnish frame in which the recessed portion 54 is not formed.

In the above embodiment disclosed here, although both of the guide members 27 are disposed to be interposed between both of the sliding members 26 in the width direction of the vehicle, when interference with the light-shielding sheet 24 is avoided, a disposition in which both of the sliding members 26 are sandwiched between both of the guide members 27 may be adopted.

In the above embodiment disclosed here, although the shade device is configured such that the light-shielding sheet 24 is unwound by moving the garnish frame 25 toward the front of the vehicle with respect to the winding shaft 23, a shade device in which the light-shielding sheet 24 is unwound by moving the garnish frame 25 toward the rear of the vehicle with respect to the winding shaft 23 may be adopted.

In the above embodiment disclosed here, winding of the light-shielding sheet 24 by the winding shaft 23 may be performed electrically by a motor, for example.

In the above embodiment disclosed here, the actuator 16 and both of the drive cables 17 may be omitted, and the movement of the garnish frame 25 (and both of the sliding members 26) in the front and rear direction may be performed manually.

In the above embodiment disclosed here, a sunroof in which the roof panel 11 provided in the unfolding 10a of the roof 10 constitutes a light-transmitting portion is adopted. In this case, the roof panel 11 may be a movable slide panel or may be a fixed panel. On the other hand, in the sunroof in which the roof as a whole is made of a resin material, a portion of the roof may be a light-transmitting portion.

In the above embodiment disclosed here, the shade device may be a device disposed on a front glass, a side glass, a rear glass or the like as a light-transmitting portion to allow or block the passage of the light at the corresponding light-transmitting portion.

In the above embodiment disclosed here, the "light-shielding sheet" includes not only those which shield the light by 100% but also those which change the light transmittance.

Technical ideas that can be grasped from the above embodiment disclosed here and the modifications disclosed here will be described.

A shade device according to an aspect of this disclosure includes a pair of guide rails that extend in parallel to each other in a first direction as one direction, a winding shaft that extends in a second direction as a direction orthogonal to the first direction on one end side of both of the guide rails in the first direction, a light-shielding sheet that has one end portion coupled to the winding shaft, a rod that extends in the second direction and is coupled to the other end portion of the light-shielding sheet, a pair of sliding members that are attached to both of the end portions of the rod in a longitudinal direction and are slidably supported by both of the guide rails, and a pair of guide members that are attached to both of the end portions of the rod in the longitudinal direction, are slidably supported by both of the guide rails, and are fixed in a state where both of the side edges of the light-shielding sheet are folded, in which the shade device is configured such that, when the rod moves in the first direction approaching the winding shaft, the light-shielding sheet is brought into a storage state in which the light-shielding sheet is wound around the winding shaft while both of the side edges folded at the guide rails are unfolded, and a light-transmitting portion disposed in a vehicle allows light to pass therethrough, and a fixing position of the side edge at the guide member is more separated from the winding shaft than from the rod, and a range in which folding and unfolding of the side edge in the storage state of the light-shielding sheet changes overlaps with a range of the rod in the first direction.

According to this configuration, the fixing position of the side edge of the guide member is more separated from the winding shaft than from the rod, and the range in which folding and unfolding of the side edge in the storage state of the light-shielding sheet changes overlaps with the range of the rod, in the first direction. That is, the light-shielding sheet in the storage state ensures a distance required for change of the folding and the unfolding of the side edge using the range of the rod in the first direction. Accordingly, in the storage state of the light-shielding sheet, the rod can be brought closer to the winding shaft in the first direction, and the allowable amount of light passing through the light-transmitting portion can be further enlarged.

In the shade device, it is preferable that both of the guide members are disposed to be interposed between both of the sliding members in the second direction, recessed portions each of which is recessed in a third direction as a direction orthogonal to the first direction and the second direction and which communicate with each other in the first direction are formed on respective end portions of the rod in the longitudinal direction, and the side edge passes through the recessed portion and is fixed to the guide member.

According to this configuration, since the side edge passes through the recessed portion and is fixed to the guide member, the space required for the three direction can be further reduced as compared with a case where the side edge is fixed to the guide member while shifting the side edge in the three direction with respect to the rod in which the recessed portion is not formed, for example.

It is preferable that the shade device further includes a pair of unfolding hold members that are disposed between both of the guide rails and the winding shaft in the first direction, allow folding of both of the side edges on both of the guide rail sides, and hold both of the side edges in an unfolded state on the winding shaft side.

According to this configuration, by the unfolding hold member, it is possible to hold the side edge in the unfolded state prior to winding up the light-shielding sheet on the winding shaft, and to more smoothly wind up the light-shielding sheet on the winding shaft.

In the shade device, it is preferable that a boundary position at which the folding of the side edge is allowed and the side edge is held in the unfolded state by the unfolding hold member is more separated from the guide rail than an outer peripheral position, which is closest to the guide rail, of the light-shielding sheet in the storage state, in the first direction.

According to this configuration, by the unfolding hold member, the light-shielding sheet in the storage state is allowed to fold back the side edge from a position more separated from the guide rail than from the outer peripheral position which is the closest to the guide rail in the first direction. Therefore, it is possible to ensure the distance required for the change of the folding and unfolding of the side edge, for example, as compared with the case of being allowed from the outer peripheral position.

In the shade device, it is preferable that fitting recessed portions each of which is recessed in a third direction as a direction orthogonal to the first direction and the second direction and which communicate with each other in the second direction are formed on respective end portions of the rod in the longitudinal direction, and a fitting projection portion that projects in the third direction and is fitted into the fitting recessed portion is formed on the sliding member.

According to this configuration, the fitting projection portion is surrounded by the fitting recessed portion by fitting into the fitting recessed portion. Accordingly, for example, when the rod is set to have higher rigidity than the sliding member, deformation of the fitting projection portion is suppressed by the fitting recessed portion. Therefore, it is possible to more efficiently transmit power in the first direction between the rod and the sliding member.

In the shade device, it is preferable that the coupling portion of the rod and the sliding member overlaps with the sliding portion of the sliding member in the view in the third direction.

According to this configuration, the coupling portion of the rod and the sliding member overlaps with the sliding portion of the sliding member at the third direction viewpoint to eliminate the difference between the first direction and the second direction. Accordingly, occurrence of twisting at the coupling portion of the rod and the sliding member can be suppressed.

In the shade device, it is preferable that a pair of curved surfaces are formed on the fitting projection portion of each of the sliding members in a state where both of the corner portions in the third direction on a side opposite to each other in the second direction are chamfered.

According to this configuration, the phase difference generated in the third direction between the sliding members can be alleviated by both of the curved surfaces.

In the shade device, it is preferable that a pair of second curved surfaces are formed on the fitting projection portion in a state where both of the corner portions are chamfered in the first direction.

According to this configuration, the phase difference generated in the first direction between the sliding members can be alleviated by both of the second curved surfaces.

This disclosure has an effect of further enlarging an allowable amount of light passing through the light-transmitting portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shade device comprising:
    a pair of guide rails that extend parallel to each other in a first direction;
    a winding shaft that extends in a second direction orthogonal to the first direction, the winding shaft being disposed at a respective end side of each of the guide rails;
    a light-shielding sheet that has one end portion coupled to the winding shaft;
    a rod that extends in the second direction and is coupled to an other end portion of the light-shielding sheet;
    a pair of sliding members; and
    a pair of guide members, wherein
    each of the pair of sliding members and each of the pair of guide members are attached to a respective longitudinal end portion of the rod and slidably supported by a respective one of the guide rails,
    each of the pair of guide members is attached to a respective one of side edges of the light-shielding sheet,
    the shade device is configured such that, when the rod moves in the first direction approaching the winding shaft, the light-shielding sheet is brought into a storage state in which the light-shielding sheet is wound around the winding shaft while the side edges folded at the guide rails are unfolded, and a light-transmitting portion disposed in a vehicle allows light to pass therethrough,
    each of the side edges of the light-shielding sheet is fixed to a respective one of the the guide members at a respective fixing position disposed further from the winding shaft than from the rod,
    when the light-shielding sheet is in the storage state, the rod overlaps with portions of the light-shielding sheet in which folding and unfolding of the side edges of the light-shielding sheet changes,
    both of the guide members are disposed to be interposed between both of the sliding members in the second direction,
    the rod defines recessed portions,
    each of the recessed portions being recessed in a third direction orthogonal to both the first direction and the second direction and being disposed on a respective longitudinal end portion of the rod, and
    each of the side edges passes through a respective one of the recessed portions and is fixed to a respective one of the guide members.

2. The shade device according to claim 1, further comprising:
    a pair of unfolding hold members,
    each of the unfolding hold members being disposed between a respective one of the guide rails and the winding shaft in the first direction, and allowing a respective one of the side edges to be folded on a guide rail side and to be held in an unfolded state on a winding shaft side.

3. The shade device according to claim 2, wherein,
    a boundary position at which the folding of the side edge is allowed and the side edge is held in the unfolded state by the unfolding hold member is more separated from the guide rail than an outer peripheral position, which is closest to the guide rail, of the light-shielding sheet in the storage state, in the first direction.

4. The shade device according to claim 1, wherein
    the rod defines fitting-recess portions,
    each of the fitting-recess portions being recessed in a third direction orthogonal to both the first direction and the second direction and being disposed on a respective longitudinal end portion of the rod, and
    each of the sliding members defines a fitting projection portion that projects in the third direction and is fitted into a respective one of the fitting-recess portions.

5. The shade device according to claim 2, wherein
    the rod defines fitting-recess portions,
    each of the fitting-recess portions being recessed in a third direction orthogonal to both the first direction and the second direction and being disposed on a respective longitudinal end portion of the rod, and
    each of the sliding members defines a fitting projection portion that projects in the third direction and is fitted into a respective one of the fitting-recess portions.

6. The shade device according to claim 3, wherein
    the rod defines fitting-recess portions,
    each of the fitting-recess portions being recessed in a third direction orthogonal to both the first direction and the second direction and being disposed on a respective longitudinal end portion of the rod, and
    each of the sliding members defines a fitting projection portion that projects in the third direction and is fitted into a respective one of the fitting-recess portions.

7. The shade device according to claim 1, wherein,
    a coupling portion where the rod and one of the sliding members are coupled together overlaps with a sliding portion of said one of the sliding members when said one of the sliding members is viewed in a third direction orthogonal to both the first direction and the second direction.

8. The shade device according to claim 4, wherein,
    the fitting projection portion defines a pair of curved surfaces in a state where corner portions in the third direction on a side opposite to each other in the second direction are chamfered.

9. The shade device according to claim 4, wherein,
    the fitting projection portion defines a pair of curving surfaces in a state where corner portions are chamfered in the first direction.

* * * * *